UNITED STATES PATENT OFFICE.

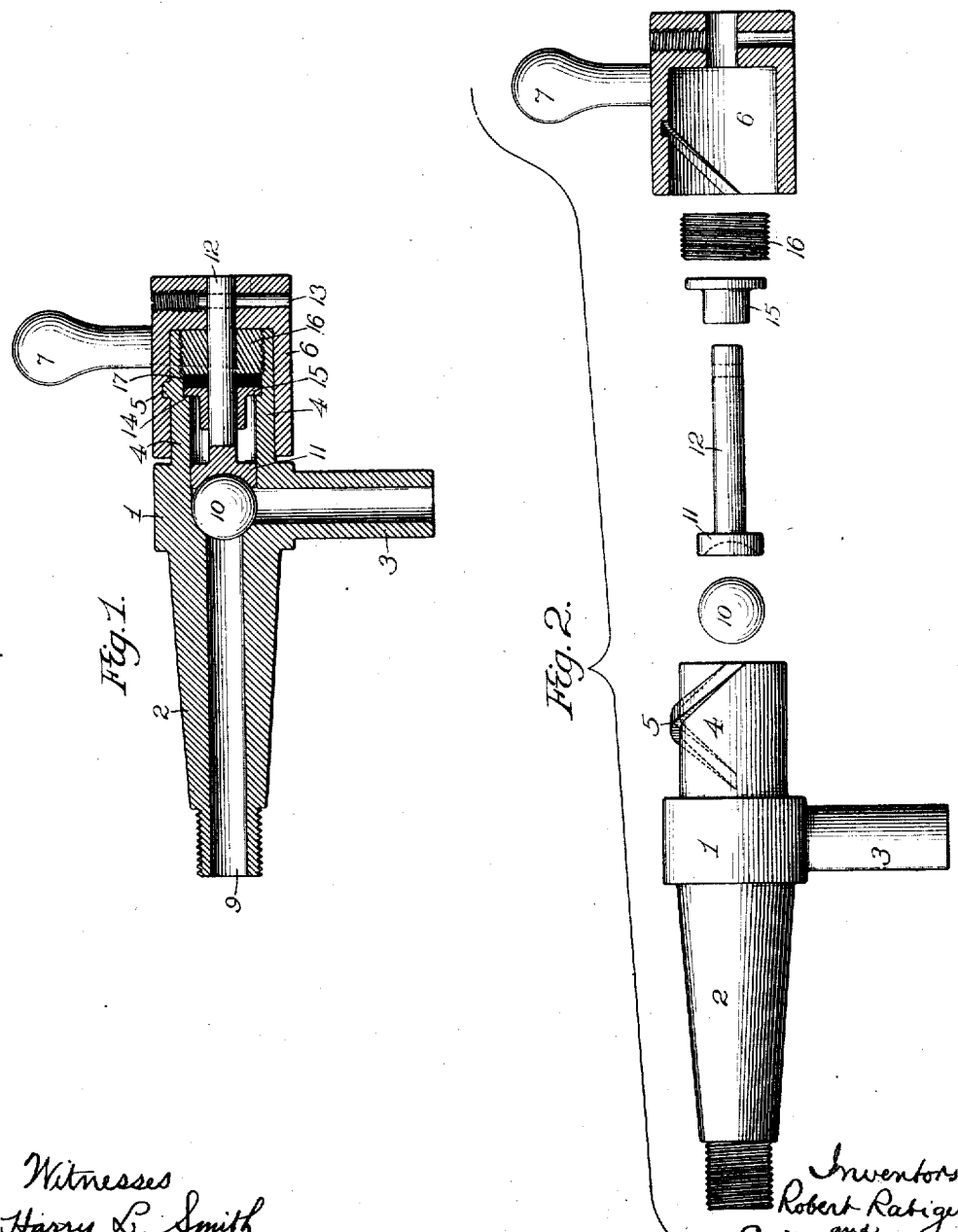

ROBERT RABIGER AND EMIL RABIGER, OF PHILADELPHIA, PENNSYLVANIA.

SPIGOT.

995,903.

Specification of Letters Patent. Patented June 20, 1911.

Application filed June 14, 1910. Serial No. 566,883.

*To all whom it may concern:*

Be it known that we, ROBERT RABIGER and EMIL RABIGER, both citizens of the United States, residing in Philadelphia, Pennsylvania, have invented certain Improvements in Spigots, of which the following is a specification.

Our invention relates to that class of spigots in which the valve plunger is carried by a nut, usually weighted and having a threaded connection with the body of the spigot, the object of our invention being to construct a simple spigot of this type and one which will withstand wear for a longer time than such spigots as usually constructed.

In the accompanying drawing—Figure 1 is a longitudinal vertical section of a spigot constructed in accordance with our invention, and Fig. 2 is a view representing, partly in side elevation and partly in section, parts of the spigot separated from one another.

1 represents the casing or body of the spigot which has a projecting stem 2 threaded or otherwise constructed at the end for application to the barrel or other vessel containing the liquid to be dispensed. The spigot body also has a depending dispensing nozzle 3 and a forwardly projecting, tubular, and externally cylindrical portion 4, upon which is formed an external thread 5, which engages an internal thread cut in a nut 6, the latter being free to move to and fro and to turn upon the cylindrical portion 4 of the spigot body and being provided with a weighted handle 7, which, when thrown over to the right, causes the nut 6 to advance, and, when thrown to the left, causes said nut to retreat.

The bore 9 of the stem 2 is enlarged in diameter at its forward end so as to form a seat for a ball valve 10 which is also adapted to a socket in the inner end of a sliding plunger 11, the latter being free to move back and forth in the enlarged forward portion of the bore but being reduced in diameter, as shown at 12, to form a reduced stem which is fitted to an opening in the nut 6 and is secured to said nut by means of a transverse pin 13, or other suitable means. Within the spigot body the bore is still further enlarged to form a shoulder 14 against which bears a flange at the rear of a gland 15, which constitutes a guide for the stem 12 of the plunger. The enlarged bore of the spigot body is internally threaded for the reception of a follower 16 between whose inner end and the shoulder 14 is secured a mass 17 of any suitable packing which serves to prevent leakage around the stem 12.

The inner end of the gland 15 provides a stop for contact with the shoulder formed by reducing the diameter of the plunger to form the stem 12, the outward movement of the plunger 11 being thereby limited. The thread upon the follower 16 has, by preference, a pitch which is the reverse of that of the thread 5 on the outside of the portion 4 of the spigot barrel, whereby the frictional contact of the stem 12 of the plunger 11 with the follower, when said plunger is retracted, will tend to tighten the follower instead of loosening it, as it would, if both threads were pitched in the same direction.

The ball valve 10 is free to turn in the socketed inner end of the plunger 11 so that it continually presents new faces to its seat, and thereby remains in operative condition for a much longer time than the fixed washer with which a spigot of this type is ordinarily provided. The parts of the spigot, moreover, are few and of simple construction, hence the spigot can be made at less cost than ordinary spigots of its class.

We claim:

1. The combination of the spigot body having an external thread thereon and a bore enlarged at its forward end to provide a valve seat, a plunger sliding in said enlarged forward portion of the bore, a ball valve interposed between said plunger and the seat, and a nut connected directly to said plunger and engaging the said external thread of the spigot body.

2. The combination of the spigot body having an external thread thereon and an internal valve seat, a valve plunger having its outer portion reduced in diameter, a ball valve interposed between the plunger and the seat, a gland in which the reduced portion of the plunger is free to slide, which gland serves as a stop to limit the forward movement of the plunger, an internal mass of packing which surrounds the reduced portion of the plunger, a follower which confines said packing, and a nut secured directly to the reduced outer portion of the plunger and engaging the thread on the outside of the spigot body.

3. The combination of the spigot body having an internal valve seat, a valve plunger, a nut secured thereto and having threaded connection with the spigot body, an internal mass of packing surrounding the plunger, and a follower also surrounding the plunger and confining said packing, said follower having threaded connection with the spigot body, which thread is pitched reversely of that which engages the nut.

In testimony whereof, we have signed our names to this specification, in the presence of two subscribing witnesses.

ROBERT RABIGER.
EMIL RABIGER.

Witnesses:
  CHAS. BENTLEY COLLINS,
  KATE A. BEADLE.